Figure 1:
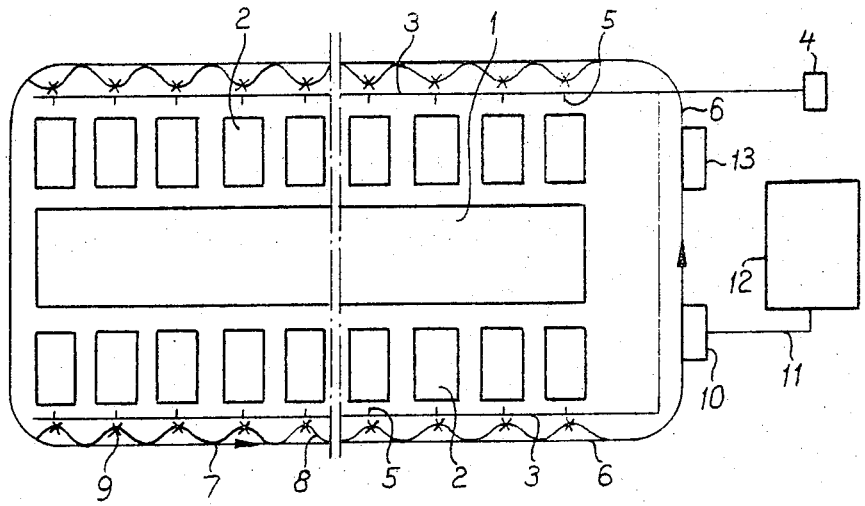

United States Patent

Strom

[15] 3,695,231

[45] Oct. 3, 1972

[54] MILKING SYSTEM

[72] Inventor: Sven Olof Erik Strom, Huddinge, Sweden

[73] Assignee: Alfa-Laval AB, Tumba, Sweden

[22] Filed: July 2, 1970

[21] Appl. No.: 51,830

[30] Foreign Application Priority Data

July 7, 1969 Sweden ......................9609/69

[52] U.S. Cl. .................................................119/14.11
[51] Int. Cl. ..................................................A01j 09/08
[58] Field of Search ...............119/14.11, 14.04, 14.08

[56] References Cited

UNITED STATES PATENTS

| | | | |
|---|---|---|---|
| 2,092,440 | 9/1937 | Cain | 119/14.04 |
| 2,469,519 | 5/1949 | Redin et al. | 119/14.11 X |
| 3,402,699 | 9/1968 | Cain | 119/14.04 |
| 3,460,515 | 8/1969 | Page et al. | 119/14.04 |
| 3,556,053 | 1/1971 | Padman et al. | 119/14.08 |

*Primary Examiner*—Hugh R. Chamblee
*Attorney*—Davis, Hoxie, Faithfull & Hapgood

[57] ABSTRACT

A conveying path for milk containers with their respective teat cup clusters extends in a closed circuit and along a row of cow stalls. Switches for the respective stalls are located in said path, each switch being operable in a first position to convey from the path to the corresponding stall a milk container with its cluster and to return the container and cluster to the path after completion of milking, each switch being operable in a second position to prevent a container and cluster from entering the corresponding stall when it is occupied by another container and cluster. The system also includes an emptying station located in said path for emptying the containers, and a treating station located in said path for washing and disinfecting the containers and their teat cup clusters.

2 Claims, 3 Drawing Figures

SVEN OLOF ERIK STROM
INVENTOR.

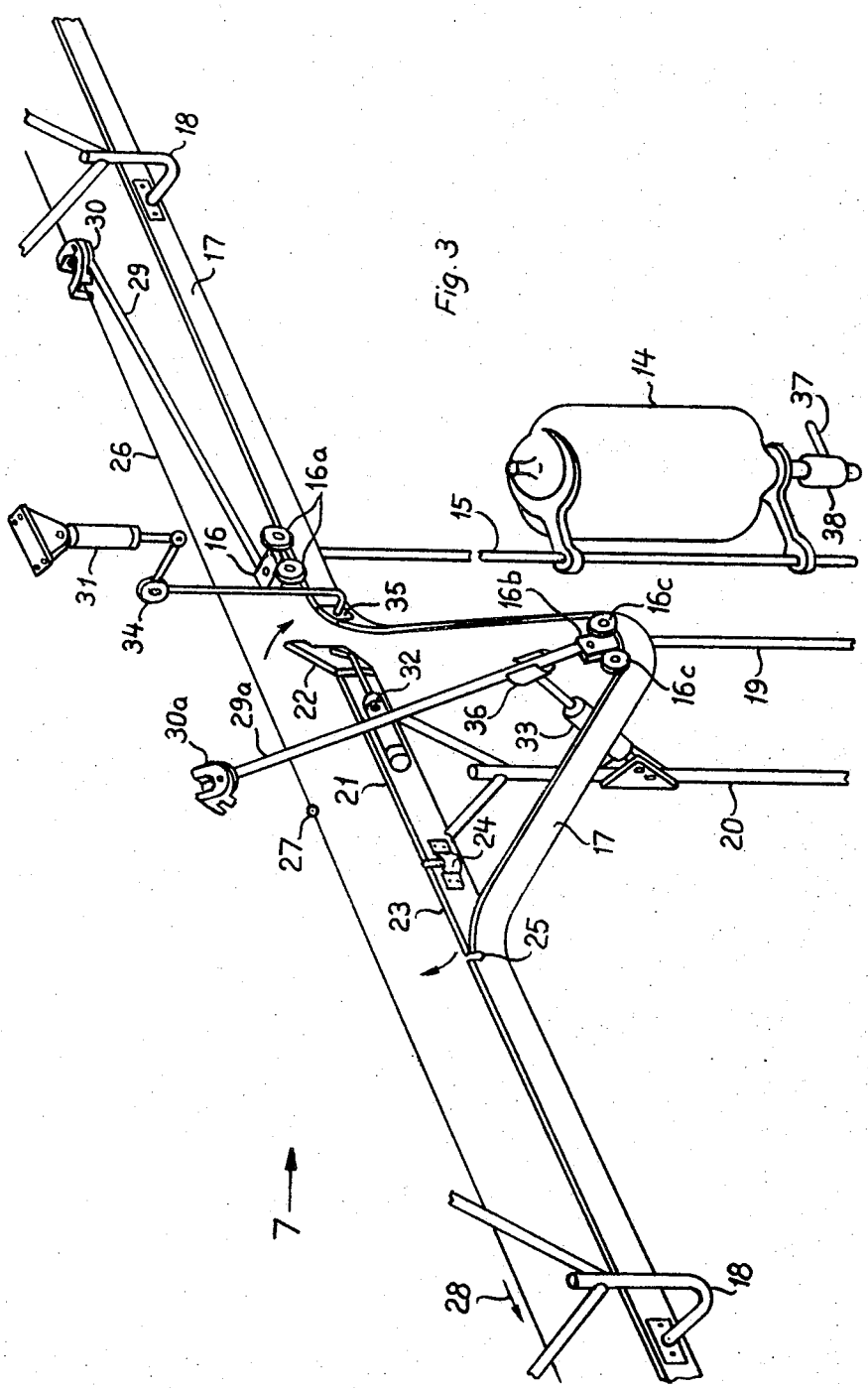

MILKING SYSTEM

The present invention relates to a milking system and has for its object to effect milking of a great number of cows while utilizing a small number of attendants, to make an individual measurement possible of the milk delivered by each cow, to make it possible to take away or segregate the milk which has been delivered by a sick cow, and to ensure a good hygiene in the milking system.

According to the invention, these requirements are met by a milking system characterized by a conveying path for milk containers with accompanying teat cup clusters, said path extending in a closed circuit and passing a row of cow stalls, by a switch in the conveying path for each cow stall, on one hand for conveying away from the path a milk container together with its teat cup cluster to the stall and on the other hand for returning the container together with its teat cup cluster to the path after finished milking, by an emptying station, provided in the path, for the milk containers, and by a washing and disinfection station, provided in the path, for the containers with the appurtenant teat cup clusters.

In order to save labor, the teat cup clusters can be arranged to be removed automatically from the udder after completion of milking. According to the invention, the mechanism for the removal of the teat cup cluster can be arranged to initiate the return of the corresponding container together with its teat cup cluster to the path.

According to a suitable embodiment of the invention, it is necessary only to use a number of milk containers together with teat cup clusters, which is a part of the total number of the cows to be milked. This embodiment is characterized in that each switch has two positions, one which moves the milk container to a non-milked cow and one which moves the milk container past a milked cow or a cow being milked. Preferably, the shifting of the switch to the latter position takes place automatically.

Figure 2:
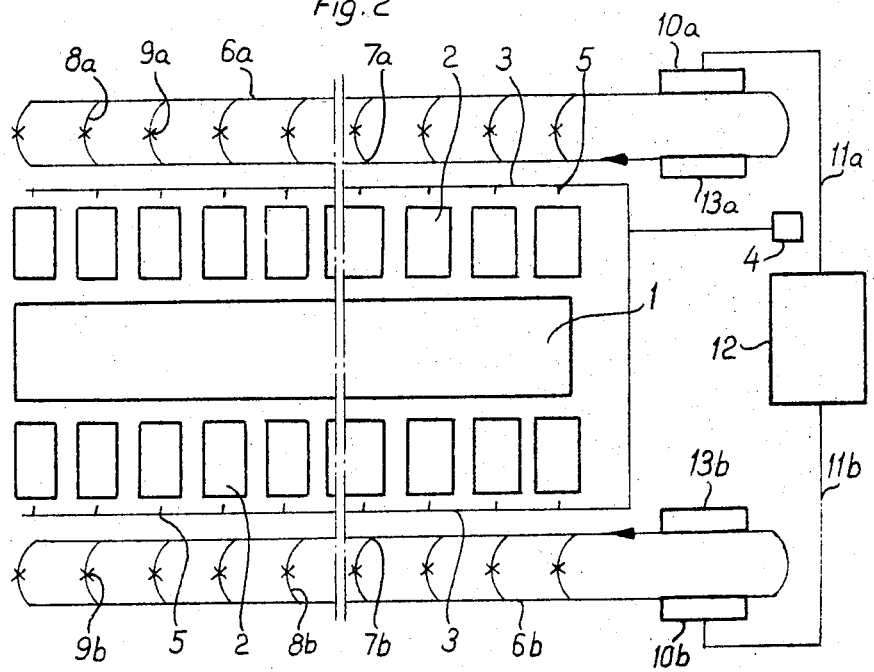

The invention is explained more in detail below, reference being had to the accompanying drawing in which FIGS. 1 and 2 schematically show a plan view of two different embodiments of the new milking system. In the two figures, corresponding details have the same reference numerals.

In FIG. 1, an elongated feeding table 1 is provided along each long side with a row of cow stalls 2. Along each row of cow stalls there extends a vacuum pipeline 3, which is connected to a vacuum pump 4 and which at each cow stall has a valve 5 to which that milk container and that pulsator, which serve for milking of a cow, can be connected by means of the usual hose (not shown). Preferably, the valve is of a type known per se, which is opened when the hose is pushed onto the valve, and which is closed when the hose is pulled from the valve. The milk containers together with teat cup clusters hanging on them are moved, preferably by means of a motor-driven chain, along a conveying path 6 extending in a closed circuit. This path is provided with switches 7 which lead into switch tracks 8, where the milk containers stay in positions 9 suitable for milking of a cow. An emptying station 10 for the milk is also provided in a point of the path. The milk passes from this station through a pipeline 11 to a collection tank 12 provided with a cooler. Also, there is provided in a point of the path a station 13 for washing and disinfection of the milk containers and their accompanying teat cup clusters.

Before the milking, all switches 7 are shifted to milking position; that is, they are set to lead the milk containers to the positions 9, whereupon a conveying chain which moves the containers along the path 6 is started. As soon as a container reaches a position 9, not occupied by another container, the container is led into this position on a corresponding track 8. Thus, if for example, five milk containers are used, five positions 9 in a succession will be occupied at the start of the milking. After the containers have taken their positions 9, the milker connects the earlier mentioned vacuum hose to a corresponding valve 5, the teat cups of the teat cup cluster becoming connected via the milk container to the vacuum pipeline. Thereupon the milker can also apply the teat cups to the udder. When a milk container has reached its position 9, a corresponding switch 7 is automatically shifted, so that a subsequent container can pass this occupied position and be guided into the next following free position 9. When the milking of a cow is finished, a milk flow indicator known per se gives a signal to the corresponding valve 5, which then is closed. The teat cups will then fall down from the udder, owing to lack of vacuum retaining them, and the automatic teat cup cluster removal mechanism then returns the teat cup cluster to the milk container, where the cluster is held fast. After the vacuum hose has been loosened from the corresponding valve 5, the container is returned together with its teat cup cluster on the continuation of the track 8 from the position 9 to the path 6 and is moved on the latter further to the emptying station 10. At this station the milk quantity, which has been delivered by the individual cow, is first measured, before the milk container is emptied. The emptied milk passes thereafter through the pipeline 11 to the tank 12. If an individual cow is sick, its milk can be taken charge of separately, so that it is not mixed with the other milk in the tank 12. On its way from station 10, the milk container passes station 13, where the milk container and its teat cup cluster are subjected to a compulsory washing and disinfection. Owing to the fact that this station 13 is built into the system, the milker cannot omit the cleaning of the milk containers and the teat cup clusters, which fact ensures a good milking hygiene. Thereafter, the container together with its teat cup cluster is moved further along the path 6 and passes all positions 9, where the milking has been finished or is going on, until it reaches a position 9 where no milking yet has taken place. Here the corresponding switch 7 guides the container into this position, and the milking operation runs again in the manner described above.

The embodiment shown in FIG. 2 has a conveying path extending in a closed circuit along each row of cow stalls. The details 6a to 11a and 13a in the upper part of the figure, and 6b to 11b and 13b in the lower part of the figure, correspond in their function to the details 6 to 11 and 13 in FIG. 1. Consequently, no special description of the function of the embodiment according to FIG. 2 is necessary.

FIG. 3 shows a perspective view of a switch arrangement 7 provided at each cow stall 2 in the embodiment according to FIG. 1. According to FIG. 3 a milk container 14 and its appurtenant teat cup cluster (not shown for the sake of simplicity) are supported by a rod 15 suspended in a small carriage 16 having two trundles 16a. The edge of these trundles is recessed, so that the trundles are guided on a rail 17 when running on the latter. The rail 17 is supported from the ceiling by means of suspenders 18 and from the floor by means of a post 19. Another post 20 supports a short rail 21, which forms the switch proper in cooperation with two flaps 22 and 23 hinged on the rail 21. The flap 23 is kept aligned with the rail 21 by means of a spring 24, but the spring allows the flap to be swung aside, when the carriage has to run out from the curved part of the rail 17. At one of said curved rail part the rail 17 has a recess 25 so as to allow the trundles 16a to run from the rail parts 21 to 23 to the left-hand part of the rail 17, when the carriage 16 has not been diverted into the curved part of the rail 17, i.e., in case of cow is being milked or has been milked in the stall corresponding to said curved rail part. Cf. the carriage 16b having the trundles 16c. A wire 26 having entraining means 27 fixed to it in uniform distribution conveys the carriages in the direction of the arrow 28 by means of rods 29 and 29a. These rods push the carriages before arriving at the curved rail part and pull them after the passage of said curved part. Each rod 29, 29a has a grip means 30, 30a cooperating with the entraining means 27 on the wire 26 during the movements of the carriages 16, 16b. Furthermore, there are provided pneumatic cylinders 31, 32 and 33 with appurtenant pistons. Cylinder 31 is fixed to the ceiling, cylinder 32 to the rail part 21 and cylinder 33 to the post 20. The movements of the pistons are controlled by means of a sequence control device (not shown). The piston of the cylinder 31 actuates by means of a lever system 34 a flap 35 in the rail 17 such that it is kept in its place in the rail, when a carriage has to pass into the curved part of the rail 17, while at the same time the piston of the cylinder 32 swings the flap 22 aside. When a carriage has to pass past the curved part of the rail 17, the flap 22 is swung back to its aligned position and the flap 35 is moved away from the rail 17. When a carriage has reached the milking position, such as the carriage 16b, its rod 29a is lifted upward by means of the piston of the cylinder 33 and a claw 36. When the milking is completed, the rod 29a is lowered, until it gets hold of the wire 26, and now the carriage 16b is pulled out of the curved part of the rail 17. The sequense control device prevents subsequent carriages from entering said curved rail part. When the container 14 reaches the emptying station 10, a pin 37 knocks against a fixed stop, and this pin then turns a cock 38, sitting at the bottom outlet of the container, to open position, so that the milk content of the container is emptied.

After a cow has been milked, the milk flow indicator actuates the corresponding valve 5 by electromagnetic means so as to close it, as stated before, and the automatic teat cup cluster removal mechanism then returns the teat cup cluster to the milk container in a way, known per se through, for example, the Swedish Pat. publication No. 323,240. The return of the teat cup cluster actuates by electromagnetic means a valve, in its turn actuating the pneumatic cylinder 33 so as to lower the rod 29a. It will be apparent from the foregoing that when the flaps or switch means 22 for the respective stalls are all in their closed (non-shunting) positions, they constitute parts of a rail means forming a conveying path extending in a closed circuit, such rail means also including the flaps 23, the short rails 21 and the main rail parts 17 which are aligned with the rails 21. Also, diverting devices are provided for the respective stalls, each diverting device including a shunt rail means formed by the curved rail 17 (i.e., the rail part 17 supporting the carriage 16b in FIG. 3); and each such shunt rail means is associated with the corresponding switch means 22 and is operable in the shunting or open position of the latter (FIG. 3) to direct a carriage from the aforementioned conveying path to the corresponding stall and thence back to said path after completing of milking. Each carriage is movable along the rail means (including the shunt rail means) by the previously described means including the parts 26, 27, 29 and 30.

I claim:

1. In a milking system, the combination of rail means forming a conveying path extending in a closed circuit, a row of cow stalls along which said path extends, a plurality of carriages movable along said path, a milk container carried by each carriage for receiving milk at one of said stalls, said rail means including switch means for the respective stalls, each switch means being located in said path and movable to a shunting position, diverting devices for the respective stalls and each including shunt rail means associated with the corresponding switch means and operable in said shunting position thereof to direct a said carriage from said path to the corresponding stall and thence back to said path after completion of milking, an emptying station located in said path for receiving milk from said containers, and means for moving the carriages along said rail means.

2. A milking system according to claim 1, in which each switch means is movable to a non-shunting position for directing a said carriage along said path while by-passing the corresponding shunt rail means and stall.

* * * * *